United States Patent [19]

Ikeda et al.

[11] Patent Number: 4,940,999

[45] Date of Patent: Jul. 10, 1990

[54] LIQUID JET RECORDING HEAD

[75] Inventors: Masami Ikeda, Machida; Makoto Shibata, Hiratsuka; Hiroto Matsuda, Ebina; Hiroto Takahashi, Hiratsuka, all of Japan

[73] Assignee: Canon Kabushiki Kaisha, Tokyo, Japan

[21] Appl. No.: 372,167

[22] Filed: Jun. 27, 1989

Related U.S. Application Data

[63] Continuation of Ser. No. 873,295, Jun. 9, 1986, abandoned, which is a continuation of Ser. No. 598,975, Apr. 11, 1984, abandoned.

[30] Foreign Application Priority Data

Apr. 20, 1983 [JP] Japan .................................. 58-69587

[51] Int. Cl.[5] .............................................. G01D 15/18

[52] U.S. Cl. .................................................. 346/140 R

[58] Field of Search ....................... 346/76 PH, 140 R; 219/216

[56] References Cited

U.S. PATENT DOCUMENTS

| | | | |
|---|---|---|---|
| 3,669,733 | 6/1972 | Allington | 427/53.1 X |
| 4,074,109 | 2/1978 | Baraff et al. | 219/216 X |
| 4,345,262 | 8/1982 | Shirato et al. | 346/140 R |
| 4,410,899 | 10/1983 | Haruta et al. | 346/140 R |
| 4,429,321 | 1/1984 | Matsumoto | 346/140 R |
| 4,602,261 | 7/1986 | Matsuda et al. | 346/140 |

FOREIGN PATENT DOCUMENTS

| | | | |
|---|---|---|---|
| 3012946 | 10/1980 | Fed. Rep. of Germany . | |
| 3228887 | 2/1983 | Fed. Rep. of Germany . | |
| 54-17854 | 2/1979 | Japan | 400/120 |
| 54-47665 | 4/1979 | Japan | 346/76 PH |
| 54-161947 | 12/1979 | Japan | 400/120 |

OTHER PUBLICATIONS

"Extra Metallization Level for Integrated Resistors", Glang & Schaible, IBM Tech. Disc. Bull., vol. 9, No. 2, pp. 128, 129, Jul. 1966.

*Primary Examiner*—Bruce A. Reynolds
*Assistant Examiner*—Gerald E. Preston
*Attorney, Agent, or Firm*—Fitzpatrick, Cella, Harper & Scinto

[57] ABSTRACT

A liquid jet recording head is provided with a liquid discharging portion having an orifice provided to discharge liquid and form flying liquid droplets and a liquid flow path communicating with the orifice and having as a part of the construction thereof a heat-acting portion in which heat energy for forming the liquid droplets acts on the liquid. The heat acting portion includes electro-thermal converting element comprising a heat-generating resistive layer provided on a base plate and at least a pair of opposed electrodes between which a heat-generating portion is formed by the resistive layer, wherein the width of the electrodes in at least the portion thereof which is in contact with the heat-generating portion is greater than the width of the heat-generating resistive layer corresponding thereto.

11 Claims, 7 Drawing Sheets

LIQUID JET RECORDING HEAD

This application is a continuation of application Ser. No. 06/873,295 filed Jun. 9, 1986, now abandoned, which in turn is a continuation of application Ser. No. 598,975, filed Apr. 11, 1984, now abandoned.

BACKGROUND OF THE INVENTION

1. Field of the Invention

This invention relates to a liquid jet recording head which jets liquid and forms flying liquid droplets for recording.

2. Description of the Prior Art

Ink jet recording methods such as jet recording, have recently drawn attention in that noise occurring during recording is negligible high-speed recording is possible and recording can be accomplished without requiring a special process to fix images on so-called plain paper.

Among such the liquid jet recording methods, those disclosed, for example, in Japanese Laid-open Patent Application No. 51837/1979 and German Laid-open Patent Application (DOLS) No. 2843064 have characteristics different from certain other liquid jet recording methods in that heat energy is caused to act on liquid to thereby obtain a driving force for liquid droplet discharge.

That is, the recording methods disclosed in the above-mentioned publications are characterized in that liquid subjected to the heat energy causes a state change which may result in a sharp increase in volume and, by the force resulting therefrom, liquid is discharged from an orifice at the end of the recording head portion, whereby flying liquid droplets are formed, adhere to the recording medium and thus accomplished recording.

Especially, the liquid jet recording method disclosed in DOLS No. 2843064 is not only very effectively applicable to the so-called drop-on demand recording method, but also readily permits the recording head portion to be of the full line type with a very dense multi-orifice arrangement, so that images of a high degree of resolution and high quality can be obtained at a high speed.

The recording head portion of apparatus applied to the above-described recording method is provided with a liquid discharging portion having an orifice provided to discharge liquid and a liquid flow path communicating with the orifice and having as a part of the construction thereof a heat-acting portion, in which heat energy for discharging liquid droplets acts on the liquid, and an electro-thermal converting element as means for generating heat energy.

This electro-thermal converting element is provided with a pair of electrodes and a heat-generating resistance layer connected to these electrodes and having a heat-generating area (a heat-generating portion) between these electrodes, and generally has in the upper portion thereof a protection layer covering the electrodes and the surface of the heat-generating portion and is formed on an insulative base plate. A fragmentary cross-sectional view for illustrating a typical structure thereof is shown in FIG. 1 of the accompanying drawings.

As shown in FIG. 1, an electro-thermal converting element 101 has a structure in which there is layered, in this order a back-up member 102 formed of silicon, glass or ceramics, a lower layer 103 disposed on the back-up member 102 and formed of $SiO_2$ or the like, a heat-generating resistive layer 104 for generating heat energy on the lower layer 103, an electrode layer 105 formed of Al or the like, layered on the heat-generating resistive layer 104 and supplying a current corresponding to a signal, a first upper layer 106 formed of $SiO_2$ or the like and protecting the heat-generating resistive layer 104 and the electrode layer 105, a second upper layer 107 formed of polyimide resin or the like for making up for any defect of the first upper layer 106 and a third upper layer 108 formed of Ta or the like and reinforcing the mechanical strength. Although the upper layers are shown as a three-layer structure, three layers are not always necessary but one to two layers may also be used or four or more layers may sometimes be used for protection. If the heat-generating resistive layer 104 or the electrode layer 105 has an ink-resisting property and has a sufficient mechanical strength, the upper layers need not always be provided.

Now, if the electro-thermal converting element 101 is seen from above with the upper layers removed therefrom, the plan view thereof will be as shown in FIG. 2 of the accompanying drawings wherein a heat-generating portion 109 and a number of electrodes 105-1 and 105-2 for supplying power to cause the heat-generating portion 109 to generate heat are juxtaposed on the lower layer 103.

Formation of the heat-generating portion 109 and the electrodes 105-1 and 105-2 is generally accomplished by the following process. A heat-generating resistive layer 104 consisting of $HfB_2$ or the like, for example, is formed on the surface of a member comprising the back-up member 102 and the lower layer 103 formed thereon, by a method such as deposition or sputtering, and an electrode layer 105 consisting of Al or the like, for example, is further formed on the upper surface of the heat-generating resistive layer 104 by a similar method. Then, by the use of a photomask having such a pattern as shown in FIG. 3 of the accompanying drawings, a part of the electrode layer 105 and the heat-generating resistive layer is removed by the so-called photoetching method and further, a part of the electrode layer 105 is etched by the use of a photo-mask having such a pattern as shown in FIG. 4 of the accompanying drawings, whereby an electrode and a heat-generating portion of desired shapes are formed at desired positions.

However, it is very difficult to accurately align the pattern shown in FIG. 3 and the pattern shown in FIG. 4 and therefore, after photoetching, such positional deviations as shown in FIG. 5 of the accompanying drawings is liable to occur. As a result, the distribution, density, etc. of the current flowing to the heat-generating portion can become irregular in each manufactured head, and this has caused the durability and reliability of the manufactured recording heads to deteriorate. This in turn has caused irregularity of the resistance value of the heat-generating portion and has lowered the manufacturing yield of the products.

SUMMARY OF THE INVENTION

The present invention has been made in view of the above-noted points and a primary object thereof is to provide a liquid jet recording head in which the deterioration of reliability and durability due to the inconveniences in manufacture is eliminated and which is excellent in durability in frequently repeated use or continuous long-time use and capable of maintaining the initial good liquid droplet formation characteristic stably for a long period of time.

It is another object of the present invention to eliminate the irregularity in manufacture and greatly improve the product yield of the recording head.

It is still another object of the present invention to provide a liquid jet recording head which is provided with a liquid discharging portion having an orifice provided to discharge liquid and form flying liquid droplets and a liquid flow path communicating with the orifice and having as a part of the construction thereof a heat-acting portion in which heat energy for forming the liquid droplets acts on the liquid, and an electro-thermal converting element electrically connected to a heat-generating resistive layer provided on a base plate, the electro-thermal converting element being provided with at least a pair of opposed electrodes between which a heat-generating portion is formed, and wherein the width of the electrodes in at least the portion thereof which is in contact with the heat-generating portion is greater than the width of the heat-generating resistive layer corresponding thereto.

It is also an object of the present invention to provide a liquid jet recording head which has an orifice provided to form flying liquid droplets and an electro-thermal converting element having a pair of electrodes opposed to each other at a desired interval and connected to a heat-generating resistive layer for generating energy for discharging the liquid droplets, said interval providing a heat-generating portion, and wherein the width of the electrodes in the connecting portion between the electrodes and the heat-generating resistive layer is wider than the heat-generating resistive layer in at least the portion thereof which is in contact with the heat-generating portion.

The invention will become fully apparent from the following detailed description thereof taken in conjunction with the accompanying drawings.

DESCRIPTION OF THE PREFERRED EMBODIMENTS

Figure 6:
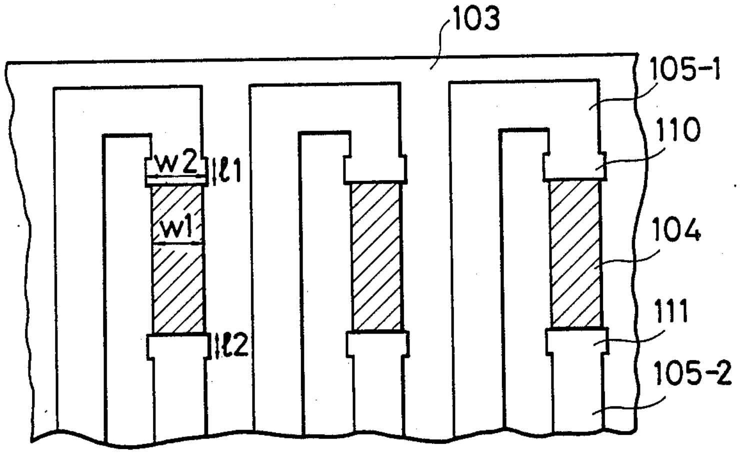
FIGS. 6 and 7 are fragmentary plan views showing an embodiment of the heat-generating portion of the liquid jet recording head of the present invention.

The present invention will hereinafter be described specifically by reference to FIGS. 6 and 7. FIG. 6 is a fragmentary plan view of the vicinity of the heat-generating portion in an embodiment of the present invention. Electrodes 105-1 and 105-2 (one of which is a common electrode and the other is a selective electrode) has, in the portions thereof which are in contact with the heat-generating portion, namely, in the end portions of the electrodes, areas 110 and 111 in which the width of the electrodes is greater than the width of the heat-generating resistive layer. That is, in the liquid jet recording head of the present invention, the width $W_2$ of the electrodes in the portion thereof which is in contact with the heat-generating portion is greater than the width $W_1$ of the heat-generating resistive layer in the heat-generating portion and therefore, even if more or less pattern misregistration occurs when the heat-generating resistive layer and electrodes are formed by the photolithographic process, it is possible to keep uniform and constant the current flowing through the heat-generating resistive layer in the heat-generating portion.

Where the installation density of the electro-thermal converting element is low, it is effective for pattern misregistration that the lengths $l_1$ and $l_2$ and width $W_2$ of the areas 110 and 111 in which the width of the electrodes is greater than the width of the heat-generating resistive layer are as great as possible, but when a multi-recording head of high density is to be manufactured, bridging based on the shorting of adjacent electrodes or on the fact that the etching in the photolithographic process is not complete is liable to occur and therefore, in such a case, it is preferable in the manufacturing yield of the recording head that the lengths $l_1$ and $l_2$ and width $W_2$ of said areas be made as small as possible within the limit in which the objects of the present invention can be achieved. The lengths $l_1$ and $l_2$ of said areas need not be equal to each other.

In this example, the width of the ordinary portions of the electrodes is made equal to the width of the heat-generating resistive layer, but the width of the electrodes may be a width $W_3$ different from the width $W_1$ of the heat-generating resistive layer. Again in this case, however, the relation between $W_1$ and $W_2$ must be $W_1 < W_2$.

Figure 7:
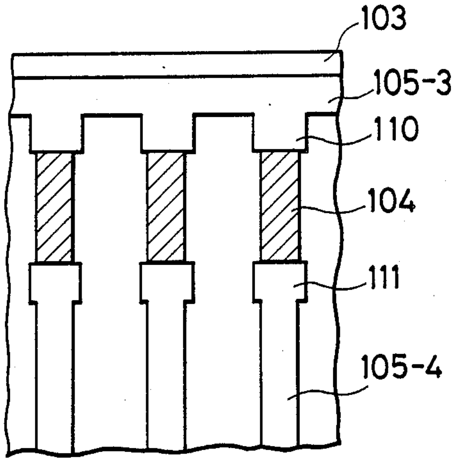

FIG. 7 is a fragmentary plan view of the vicinity of the heat-generating portion showing another embodiment of the present invention. In the case of FIG. 6, the electrodes are arranged in a turned-back fashion, but the present invention is equally applicable to a case where, as shown in FIG. 7, there is provided a common electrode 105-3 in the direction of the orifice of the liquid flow path. In this embodiment, reference numeral 105-4 designates a selective electrode.

Figure 1:
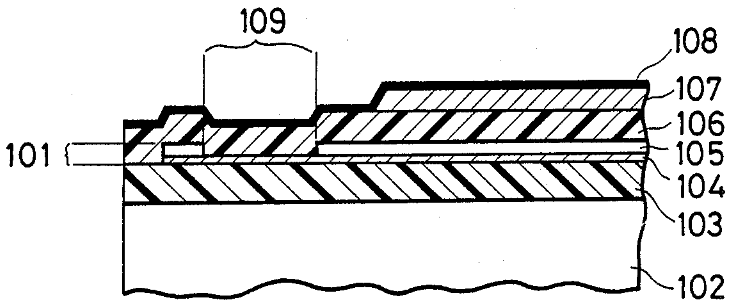
FIG. 1 shows a fragmentary cross-sectional view of the vicinity of the heat-generating portion of a liquid jet recording head.
Figure 2:
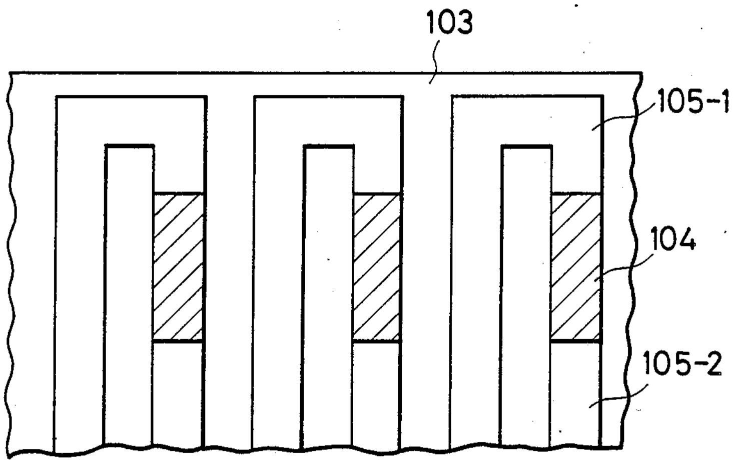
FIG. 2 shows a fragmentary plan view of the electro-thermal converting element of the conventional liquid jet recording head.
Figure 3:
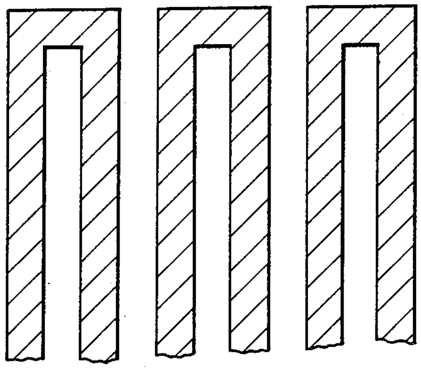
FIGS. 3 and 4 show fragmentary plan views of photomasks for forming the conventional heat-generating portion.
Figure 4:
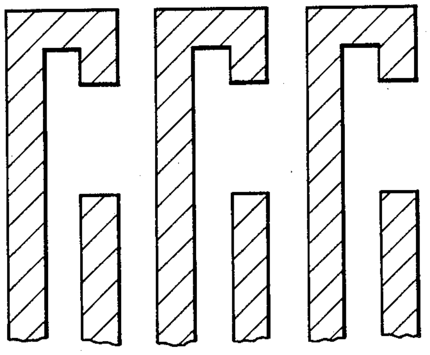
Figure 5:
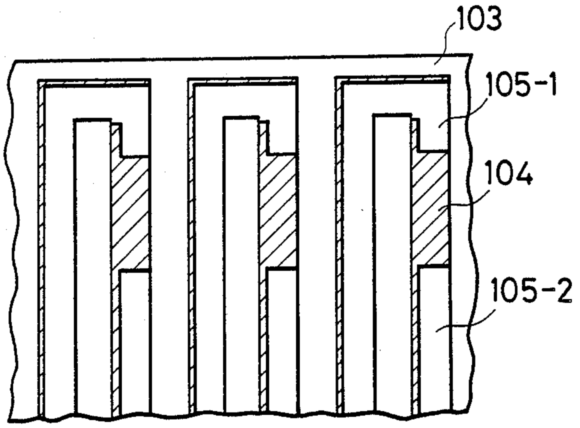
FIG. 5 shows the defective situation of the conventional heat-generating portion.

In the liquid jet recording head of the present invention, one to several upper layers described in connection with FIG. 1 are formed on a base plate on which the electro-thermal converting elements having the characteristic construction as described above is formed. The recording head is completed by forming on the base plate liquid flow paths 112 and orifices 113 corresponding to the heat-generating portions 109 formed by the electro-thermal converting elements 101.

Figure 8:
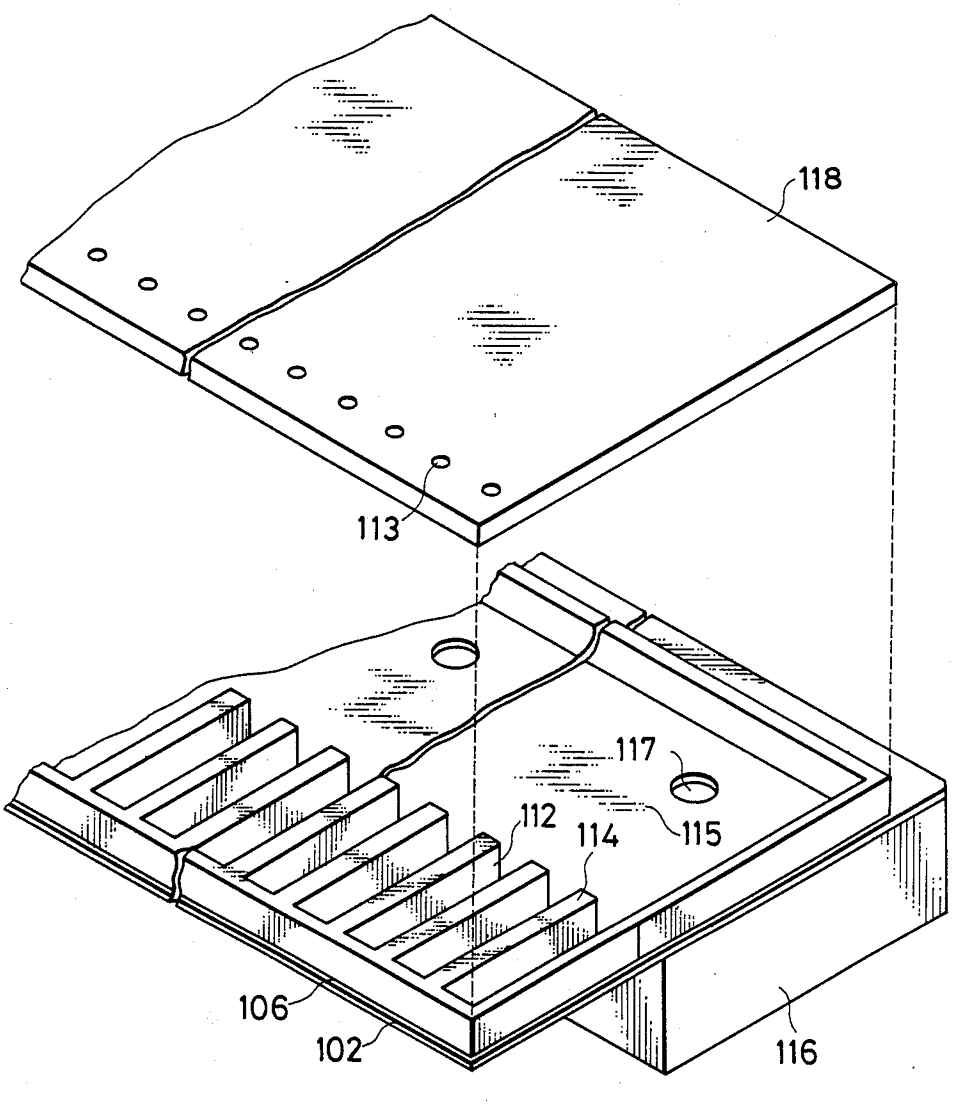
FIGS. 8 and 9 are schematic views for showing the construction of an embodiment of the liquid jet recording head of the present invention.

FIG. 8 is a schematic exploded view for showing the internal structure of an embodiment of the completed liquid jet recording head. In this embodiment, the orifices are provided above the heat-generating portion 109. Reference numeral 114 designates ink flow path walls, reference numeral 115 denotes a common liquid chamber, reference numeral 116 designates a second common liquid chamber, reference numeral 117 denotes through-holes connecting the common liquid chamber 115 to the second common liquid chamber, and reference numeral 118 designates a ceiling plate. The wiring portions of the electro-thermal converting elements are not shown.

Figure 9:
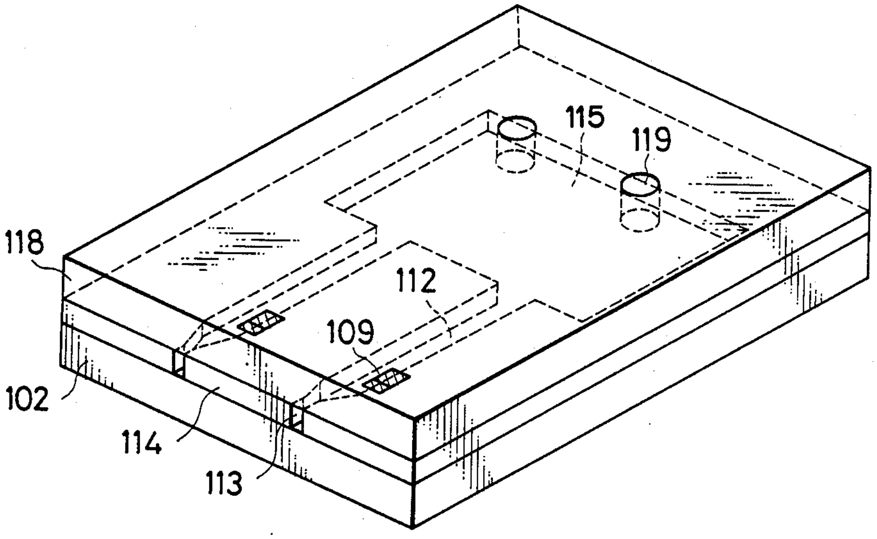

FIG. 9 is a schematic view of another embodiment of the completed liquid jet recording head. In this embodiment, orifices 113 are formed at the terminal ends of the liquid flow paths. Reference numeral 119 designates ink supply ports.

In the liquid jet recording head of the present invention having such a construction, even if the electrodes near the heat-generating portion are formed at positions more or less deviated from predetermined positions during the manufacture of the recording head, it hardly affects the current flowing through the heat-generating resistive layer and therefore, the irregularity of products obtained is small. Also, only the width of the electrodes near the heat-generating portion is made great and therefore, bridging between the electrodes in the other portion hardly occurs and thus, it has been possible to improve the manufacturing yield of the recording head.

Further, there has been obtained a liquid jet recording head which is excellent in durability in frequently repeated use or continuous long-time use of the recording head and capable of maintaining the initial good liquid drop formation characteristic stably for a long period of time.

Figure 10:
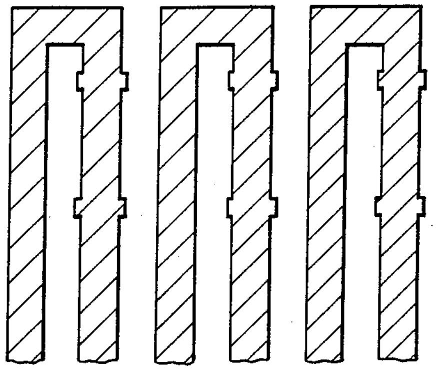
FIGS. 10 and 11 are fragmentary plan views of photomasks for forming the heat-generating portion of the liquid jet recording head of the present invention.
Figure 11:
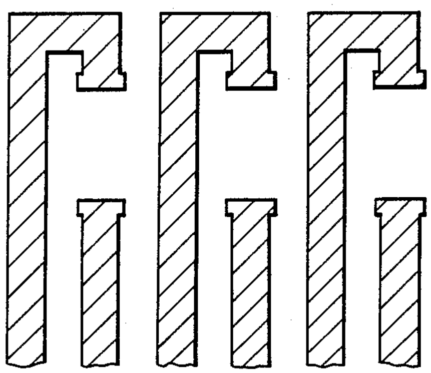

The liquid jet recording head of the present invention will hereinafter be described specifically with respect to an example thereof. Example:

Si wafer was oxidized and $SiO_2$ film having a thickness of about 5 $\mu m$ was formed on the surface thereof, and this was used as the base plate. On this base plate, $HfB_2$ as a heat-generating resistive layer was accumulated to a thickness of 3000 Å by sputtering, and then a Ti layer and an Al layer as an electrode layer were accumulated to thicknesses of 50 Å and 10000 Å, respectively, by electron-beam-deposition. Thereafter, by the use of the pattern mask shown in FIG. 10, the electrode layer and the heat-generating resistive layer were etched by a photolitho graphic process that the electrode width $W_1$ in FIG. 6 was 80 $\mu m$, $W_2$ was 100 $\mu m$ and l was 50 $\mu m$. Subsequently, to form a heat-generating portion of 80 $\mu m \times 400$ $\mu m$, by the use of the pattern mask shown in FIG. 11, selective etching of the electrode layer was effected again by the a photolitho graphic process, whereby an electro-thermal converting element was formed. When the electro-thermal converting element was thus formed, there was a margin of $\pm 10$ $\mu m$ in the electrode pattern in the portion which was in contact with the heat-generating portion and therefore, even if more or less pattern misregistration occurred in the second photolitho graphic process, little or no irregularity was detected in the resistance value between the heat-generating resistive layers. Also, occurrence of shorting and bridging between the electrodes could be suppressed substantially to the same degree as in the prior art.

Thereafter, $SiO_2$ sputter layer was accumulated to a thickness of 2.8 $\mu m$ by high-rate sputtering, and subsequently PIQ (trade name) produced by Hitachi Kasei Co., Ltd. was applied thereto by a spinner and only the upper portion of the heat-generating portion was stripped off by PIQ etchant, whereafter it was baked and hardened. Further, Ta sputter layer was accumulated to a thickness of 0.5 $\mu m$ and a base plate for a liquid jet recording head in which the electro-thermal converting element was covered with a protection layer was thus prepared.

Subsequently, a photosensitive resin dry film having a thickness of 50 $\mu m$ was layered on this base plate, and exposure and development by a predetermined pattern mask was carried out to provide liquid flow paths and a liquid supply chamber, and further a ceiling plate of glass was layered thereon with an epoxy adhesive interposed therebetween, whereby a liquid jet recording head as shown in the schematic view of FIG. 9 was made.

When a recording test was carried out on twenty liquid jet recording heads manufactured in this manner, little or no irregularity of ink discharging properties was recognized between the recording heads.

What we claim is:

1. A liquid jet recording head comprising:

a liquid discharging portion having an orifice for discharging liquid as a flying liquid droplet and a liquid area communicating with said orifice; and a electrode-thermal converting element including a heat-generating resistive layer and an electrode electrically connected to said resistive layer to form in said resistive layer a heat generating area in contact with said electrode for generating thermal energy and transferring said thermal energy to liquid in said liquid area to discharge liquid as the flying liquid droplet, wherein said electrode has portions in contact with both ends of said heat generating area and the width of said electrode is increased only in said portions so that the width of said portions of said electrode is greater than the width of said heat-generating area at the portions thereof in contact with said electrode and said electrodes is in electrical contact with a single said heat-generating area and wherein a plurality of said liquid areas are provided and each has a corresponding said heat generating area associated therewith.

2. A liquid jet recording head according to claim 1, wherein said orifice is provided at the terminal end of said liquid area.

3. A liquid jet recording head according to claim 1, wherein said orifice is opposed to said heat-generating area.

4. A liquid jet recording head according to claim 1, wherein a protection layer is provided on said electro-thermal converting element.

5. A liquid jet recording head according to claim 1, wherein a plurality of said orifices are provided.

6. A liquid jet recording head according to claim 1, wherein said liquid jet recording head is a full-line type of head.

7. A liquid jet recording head comprising:

an orifice for discharging liquid as a flying liquid droplet; and an electro-thermal converting element including a heat-generating resistive layer and an electrode electrically connected to said heat-generating resistive layer to provide a heat-generating area in contact with said electrode for generating thermal energy for discharging liquid as the flying liquid droplet, wherein said electrode has portions in contact with both ends of said heat-generating area and the width of said electrode is increased only in said portions so that the width of said portion of said electrode is greater than the width of said heat-generating area at the portion thereof in contact with said electrode and said electrode is in electrical contact with a single said heat generating area and wherein a plurality of said orifices are provided and each has a corresponding heat generating area associated therewith.

8. A liquid jet recording head according to claim 7, wherein said orifice is opposed to said heat-generating area.

9. A liquid jet recording head according to claim 7, wherein a protection layer is provided on said electrothermal converting element.

10. A liquid jet recording head according to claim 7, wherein said orifice is disposed substantially perpendicular to the surface of said heat-generating area.

11. A liquid jet recording head according to claim 7, wherein said liquid jet recording head is a full-line type of head.

* * * * *

UNITED STATES PATENT AND TRADEMARK OFFICE
CERTIFICATE OF CORRECTION

PATENT NO. : 4,940,999

DATED : July 10, 1990

INVENTOR(S) : MASAMI IKEDA, ET AL.

It is certified that error appears in the above-identified patent and that said Letters Patent is hereby corrected as shown below:

COLUMN 1

Line 17, "negligible" should read --negligible,--.
Line 20, "the" should be deleted.
Line 30, "causes a state change" should read --undergoes a change of state,--.
Line 31, "may result" should read --results--.
Line 35, "accomplished" should read --accomplish--.

COLUMN 2

Line 51, "is" should read --are--.

COLUMN 4

Line 54, "is" should read --are--.

COLUMN 5

Line 41, "photolitho graphic" should read --photolithographic-- and "that" should read --so that--.
Line 46, "the a photolitho" should read --a photolitho- --.
Line 54, "photolitho graphic" should read --photolithographic--.

UNITED STATES PATENT AND TRADEMARK OFFICE

CERTIFICATE OF CORRECTION

PATENT NO. : 4,940,999

DATED : July 10, 1990

INVENTOR(S) : MASAMI IKEDA, ET AL.

It is certified that error appears in the above-identified patent and that said Letters Patent is hereby corrected as shown below:

COLUMN 6

Line 21, "a electrode-thermal converting element" should read --an electro-thermal converting element--.

Line 35, "electrodes" should read --electrode--.

Signed and Sealed this

Twenty-sixth Day of November, 1991

*Attest:*

HARRY F. MANBECK, JR.

*Attesting Officer*

*Commissioner of Patents and Trademarks*